Jan. 25, 1944.  C. E. DILLON  2,339,843
BEEF SCRIBE SAW
Filed June 5, 1941
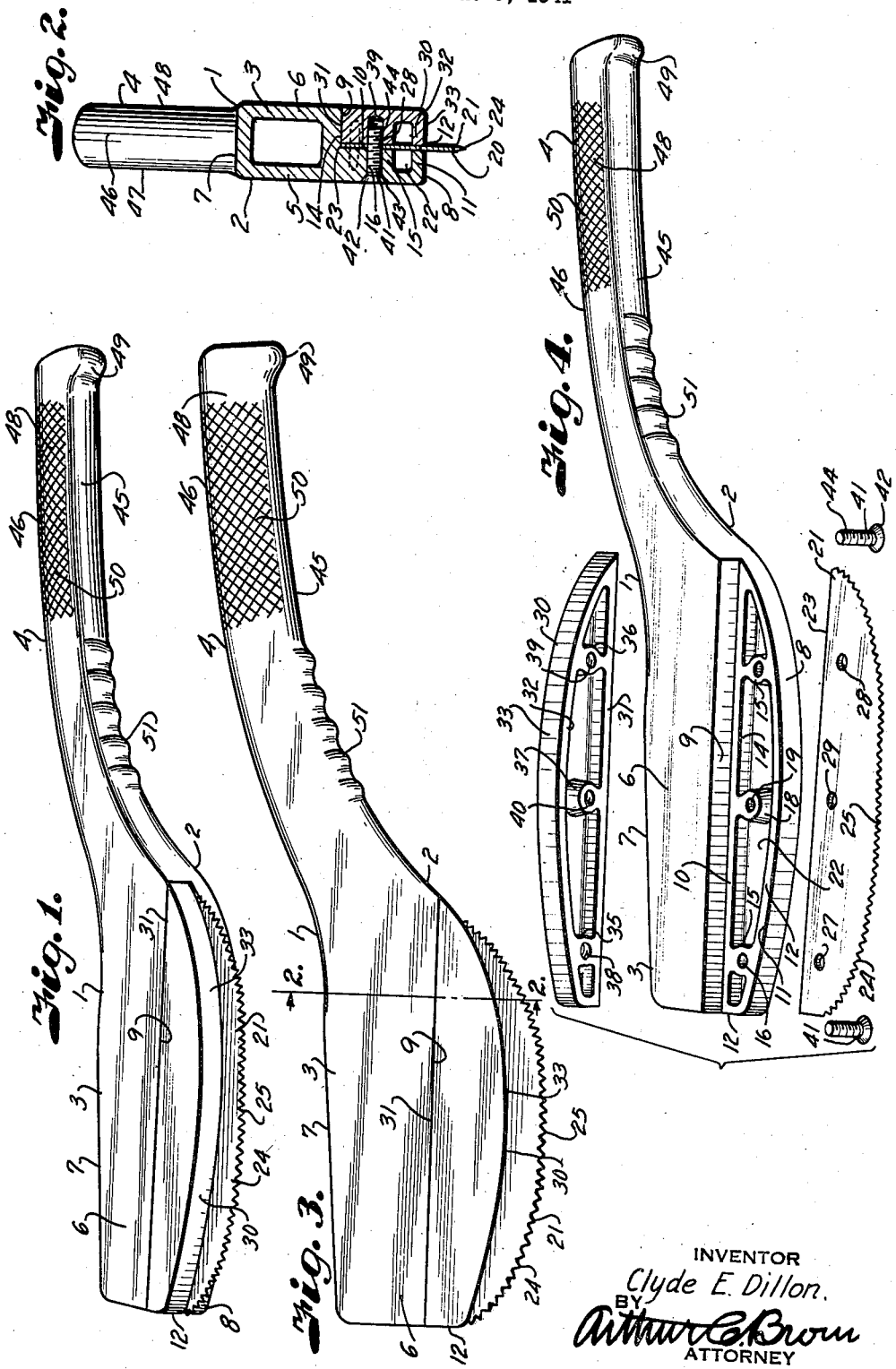
INVENTOR
Clyde E. Dillon.
BY Arthur C. Brown
ATTORNEY Patented Jan. 25, 1944

2,339,843

UNITED STATES PATENT OFFICE 2,339,843

BEEF SCRIBE SAW

Clyde E. Dillon, Kansas City, Mo., assignor to Koch Butchers' Supply Company, North Kansas City, Mo., a corporation of Missouri Application June 5, 1941, Serial No. 396,738

1 Claim. (Cl. 145—31)

This invention relates to scribe saws, particularly for scribing the backbone of a side of beef and for rounding the edges thereof on the respective sides of the scribe.

Heretofore beef scribe saws have been constructed of wood with the beef shaping sides and gauge faces thereof provided with sheet metal plates to enhance the wearing quality of the wood. Consequently, the absorptive properties of the wood and the spaces produced by buckling of the plates upon shrinkage and swelling of the wood result in an unsanitary tool, which is practically impossible to clean and sterilize.

It is the principal object of the present invention to provide a beef scribe saw formed of non-porous, non-absorptive material, preferably metal, which has sufficient hardness and smoothness to form the shaping and gauging surfaces above noted.

Other objects of the invention are to provide a beef scriber which is of light weight construction; to provide a beef scriber with a removable blade whereby the parts may be readily disassembled for sterilization; to provide a beef scribe saw having streamlined appearance; and to provide an integral handle.

In accomplishing these and other objects of the invention, I have provided improved details of structure, the preferred form of which is illustrated in the accompanying drawing, wherein:

Fig. 1 is a perspective view of a beef scribe saw constructed in accordance with the present invention.

Fig. 2 is a cross-section on the line 2—2 of Fig. 3.

Fig. 3 is a side elevational view of the beef scribe saw.

Fig. 4 is a detail perspective view of the parts of the beef scribe saw shown in disassembled spaced relation.

Referring more in detail to the drawing:

1 designates a beef scribe saw constructed in accordance with the present invention and which includes a hollow metal body 2 having a head 3 and an integral hollow handle 4. The head 3 includes flat, parallel sides 5 and 6 connected by a back 7 and an end 8 which forms a substantially right angle with the back 7 and the back 7 forms a substantially right angle with the sides 5 and 6. One side, for example 6, terminates short of the arcuate gauge or working surface 8 of the opposite side to provide a longitudinal shoulder 9 and a blade engaging seat 10. The face 8 is formed by a flange 11 extending from the end 12 to the opposite end of the shoulder 9 and having a height slightly less than half the thickness of the head whereby the edge 13 of the flange cooperates with an offset web portion 14 coextensive with the shoulder 9 to form clamping faces for one side face of a blade and a back stop for the back edge of the blade as later described.

The portion 14 and flange 11 are interconnected by bosses 15 having openings 16 extending therethrough. Projecting from the web portion 14 at a point substantially midway between the bosses 15 is a similar boss 18 provided with an opening 19. The bosses 15 and 18 have their faces preferably registering with the edge 13 of the flange 11 to engage the face 20 of a saw blade 21, later described. The flange 11, bosses 15 and 18, and web portion 14 provide clamping support for the blade and form hollow spaces 22 therebetween to cooperate with the hollow body portion of the saw in lightening the structure.

The saw blade 21 is of appropriate thickness and has a substantially straight back edge 23 engaging against the back stop shoulder 9 and has a substantially curved front edge 24 projecting from the curved face 8. The cutting or toothed edge 24 of the blade is formed on a curve of less radius than that of the face 8 so that the teeth 25 at the mid point of the blade project from the face 8 a distance equal to the maximum depth of the scribe to be effected by the saw, as clearly shown in Figs. 2 and 3, and the endmost teeth of the blade are progressively closer to the arcuate face 8 whereby the depth of scribe may be regulated by positioning the angle of the handle 4 relatively to the bone being scribed. The saw blade has openings 27, 28 and 29 registering with the openings 16 and 19, as shown in Fig. 4.

Cooperating with the blade seating portion of the head is a segment 30 conforming in shape to the portion of the body extending beyond the shoulder 9 and which includes a flange 31 abutting against the shoulder 9 and a flange 32, having a curved face 33 cooperating with the face of the flange 11 for controlling the depth of the scribe. The clamping segment also has clamping faces and bosses 35, 36 and 37 corresponding to the blade clamping faces and the bosses 15 and 18, previously described, to engage the opposite face of the saw blade. The bosses 35, 36 and 37 have threaded sockets 38, 39 and 40, registering with the saw blade openings 27, 28 and 29, whereby the section is secured by fastening devices 41 comprising screws having flat heads 42 seated in bevelled counterbores 43 of the openings 16 and 19, and threaded shanks 44 extending through the openings 16 and 19, through the openings 27, 28 and 29, and into the threaded sockets 38, 39 and 40 to draw the clamping section into clamping engagement with the saw blade and the saw blade into clamping engagement with the seat 10.

The handle 4 is continuous with the head 3, and has a side 45 forming a reverse curve with the arcuate faces 8 and 33. The opposite side 46 of the handle continues from the back 7 on a curvature substantially conforming to the side 45. The handle is also of hollow construction and the sides 45 and 46 are rounded and integrally connect with flat faces 47 and 48 forming a continuation of the side faces 5 and 6. The end of the handle terminates in a knob 49 and is provided with scoring or knurling 50 to be gripped by the fingers and palm of one hand of the user. The other hand is extended around the handle forwardly of the hand gripping the knurling, in gripping relation with a series of corrugations 51.

In using the scribe saw constructed and assembled as described, one of the hands of a user is placed over the handle portion formed by the knurling 50 and the other hand is placed around the handle so that the fingers of the hand engage the corrugations 51. The toothed edge of the saw blade is then placed against the face of the cut whereon one side of the beef is severed from the other side by splitting through the backbone and the saw is drawn along the backbone, effecting a scribe cut substantially midway the width thereof, the depth of which is gauged by the curved faces 8 and 33. After making the scribe cut along the length of the bone, the bones at the sides of the scribe are beat back into the fleshy part of the beef to round over the cut edge of the side of beef in accordance with usual practice. In rounding the side, the flat faces 5 and 6 of the scribe saw are used in the manner of a paddle.

Owing to the fact that the beef scribe saw is formed of metal, the surfaces thereof may be highly polished and the segment forms a close fit with the body of the saw to prevent accumulation of debris thereunder as in the instance of the old style wood saw above described.

After use, the parts of the saw may be readily disassembled by removing the screws 40, which release the clamping section for removal of the blade. The parts may then be sterilized and after sterilization may be readily assembled.

From the foregoing it is obvious that I have provided a beef scribe saw which is of simple, inexpensive construction, and which is designed so that it may be kept in sterilized and sanitary condition.

What I claim and desire to secure by Letters Patent is:

A beef scribe saw including, a body member having integral head and handle portions, said head portion having a shoulder-like recess providing a back stop for a cutting blade and a blade clamping face, a cutting blade seated in said recess having a side face closely contacting the clamping face of said recess and having a back edge closely engaging said back stop, a clamping section arranged to fill said recess completely and having an edge engaging said back stop and provided with a clamping face cooperating with the clamping face of said head portion, and fastening devices securing said section to clamp the cutting blade between the clamping faces and to retain the back edge of the blade against said back stop, said blade clamping faces being recessed for limiting the clamping effect on said blade to the margins of said faces.

CLYDE E. DILLON.